(12) United States Patent
Tatsuda (10) Patent No.: US 8,197,164 B2
(45) Date of Patent: Jun. 12, 2012

(54) MACHINING HEAD FOR MACHINE TOOL

(75) Inventor: Yoshinori Tatsuda, Kanazawa (JP)

(73) Assignee: Tsudakoma Kogyo Kabushiki Kaisha, Kanazawa-shi (JP)

( * ) Notice: Subject to any disclaimer, the term of this patent is extended or adjusted under 35 U.S.C. 154(b) by 553 days.

(21) Appl. No.: 12/445,600

(22) PCT Filed: Oct. 16, 2007

(86) PCT No.: PCT/JP2007/070122
§ 371 (c)(1),
(2), (4) Date: Apr. 15, 2009

(87) PCT Pub. No.: WO2008/047772
PCT Pub. Date: Apr. 24, 2008

(65) Prior Publication Data
US 2010/0189525 A1    Jul. 29, 2010

(30) Foreign Application Priority Data
Oct. 18, 2006  (JP) ................................. 2006-284016

(51) Int. Cl.
*B23C 1/12* (2006.01)
(52) U.S. Cl. ........................................ 409/201; 409/211
(58) Field of Classification Search ................... 409/144, 409/201, 199, 211, 216, 230, 231; B23C 1/12
See application file for complete search history.

(56) References Cited

U.S. PATENT DOCUMENTS

| | | | |
|---|---|---|---|
| 3,460,435 A | * | 8/1969 | Dahl et al. ............... 409/183 |
| 4,990,039 A | * | 2/1991 | Liaw ....................... 409/201 |
| 5,044,054 A | * | 9/1991 | Lin ............................ 29/39 |
| 5,584,621 A | * | 12/1996 | Bertsche et al. ........... 409/201 |
| 5,664,308 A | | 9/1997 | Deitert |

FOREIGN PATENT DOCUMENTS

| | | | |
|---|---|---|---|
| JP | 58171239 A | * | 10/1983 |
| JP | 59-153201 U | | 10/1984 |
| JP | 63-38944 U | | 3/1988 |
| JP | 63-38945 U | | 3/1988 |
| JP | 64-9033 U | | 1/1989 |
| JP | 01222809 A | * | 9/1989 |
| JP | 8-215962 A | | 8/1996 |
| JP | 2001-150263 A | | 6/2001 |

OTHER PUBLICATIONS

International Search Report of PCT/JP2007/070122, Mailing Date of Nov. 27, 2007.

\* cited by examiner

*Primary Examiner* — Daniel Howell
(74) *Attorney, Agent, or Firm* — Westerman, Hattori, Daniels & Adrian, LLP (57) ABSTRACT

A machining head has a support head component, which includes first and second support segments and a base segment supporting both the first and second support segments, the support segments being disposed opposite to each other across the spindle unit to hold the spindle unit therebetween such that a center of axle thereof is aligned with a rotary axis line thereof, the first and second support segments respectively including support shafts whose opposing end surfaces have the spindle unit secured thereto. The support segments respectively include housings as main bodies that are independent of the base segment. The housings accommodate the support shafts. Each housing is attached to the base segment by means of a plurality of first screw members that are screwed to the base segment and are manipulatable from the outside. The spindle unit is attached to the support shafts by means of a plurality of second screw members that are screwed to the support shafts and are manipulatable from the outside.

1 Claim, 4 Drawing Sheets

MACHINING HEAD FOR MACHINE TOOL

TECHNICAL FIELD

The present invention relates to machining heads for machine tools, and particularly, to a machining head equipped with an index mechanism, which is used in a compound processing machine (machine tool), such as a five-axis processing machine (that is, a processing machine capable of controlling five axes simultaneously) and a multi-face processing machine.

BACKGROUND ART

Figure 5:
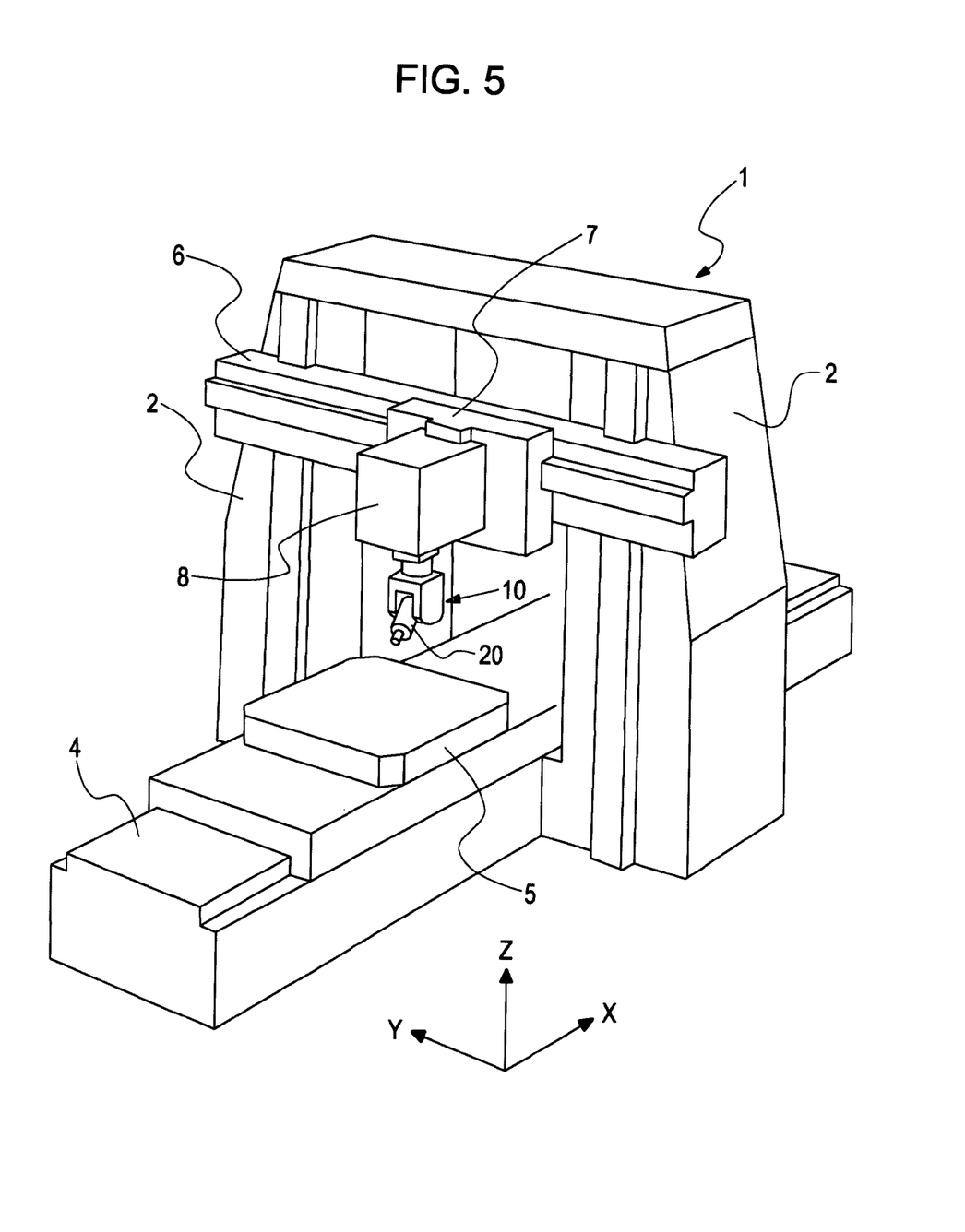
FIG. 5 is a perspective view showing an example of a machine tool to which the machining head according to the present invention is applied.

FIG. 5 illustrates a double-housing machine tool (machining center) 1 as an example of a compound processing machine. The double-housing machine tool 1 includes left and right columns 2, 2 attached to a bed 4, a cross rail 6 movable vertically (in Z-axis direction) on the columns 2, 2, a saddle 7 movable horizontally (in Y-axis direction) on the cross rail 6, a ram 8 movable in the Z-axis direction on the saddle 7, and a table 5 movable in the front-back direction (in X-axis direction) on the bed 4. Furthermore, the ram 8 has a machining head 10 attached thereto, which includes a spindle unit 20 equipped with a spindle to which a tool can be attached.

When machining a workpiece, the double-housing machine tool 1 moves the table 5, the cross rail 6, the saddle 7, and the ram 8, and the machining head 10 indexes the angular position (rotational position) of the spindle unit 20 in accordance with numerical control based on a preliminarily set program. Accordingly, in the machine tool, the tool can be set at appropriate angles for machining various surfaces of the workpiece so that the workpiece can be cut into complicated shapes.

In order to achieve this, the machining head has the spindle unit 20 and is equipped with an index mechanism within a support head component for the spindle unit 20. The index mechanism is for indexing the angular position of the spindle unit 20. A machining head equipped with a drive motor of a direct-drive type (which will be referred to as a DD motor hereinafter) is known as means for driving the index mechanism. The DD motor includes a motor stator and a motor rotor that are disposed within a housing of the machining head 10, and the rotor is linked with a support shaft that supports the spindle unit (for example, Patent Document 1).

Regarding the support head component (operating head component) included in the machining head disclosed in Patent Document 1, the support head component (first support portion) supports the spindle unit (second support portion) with a pair of support shafts disposed on opposite sides of the spindle unit.

Specifically, the support head component disclosed in Patent Document 1 has the shape of a fork in which a pair of support segments (arms) is disposed on opposite sides of the spindle unit. The support segments have the support shafts rotatably contained therein. Each of the support segments has a built-in DD motor that is linked with the corresponding support shaft. Each DD motor rotates the corresponding support shaft so that the spindle unit is rotated about an axis line of the support shaft, whereby the spindle unit can be indexed to a desired angular position.

Although not discussed in Patent Document 1, a machining head used in a machine tool is generally provided with a bearing for rotatably supporting the support shafts and a clamp mechanism for maintaining the indexed angular position of the spindle unit, which are disposed within the support head component. There are also cases where a rotary joint for supplying machining fluid to the spindle unit is disposed within the support head component. These parts will generically be referred to as elements hereinafter.

In the machining head used in the machine tool described above, there are cases where the spindle unit needs to be detached from the support head component for maintenance purposes, such as adjustment and repair. However, in a typical machining head, there are often cases where the spindle unit cannot be readily detached from the support head component by simply unscrewing screw members that maintain the fixed state between the support shafts and the spindle unit. The following is one of the reasons for such a difficulty in the detachment of the spindle unit.

Specifically, in a support head component of a typical machining head, one of the spindle unit and the pair of support shafts is provided with holes (or recesses), and the other is provided with protrusions that are engageable with the holes. The holes and protrusions are provided for the purpose of facilitating the positioning of the spindle unit relative to the support segments when the spindle unit is being attached to the support segments. The hole-and-protrusion engagement technique is generally applied for the positioning between the support shafts and the spindle unit. Consequently, in a support head component that supports the spindle unit by holding the spindle unit between the pair of support shafts disposed on opposite sides thereof, even if the screw members are unscrewed to release the fixed state between the support shafts and the spindle unit, the spindle unit cannot be detached from the support head component unless at least one of the support shafts is slid or displaced in its axial direction to disengage the support shaft from the spindle unit.

Accordingly, in addition to unscrewing the screw members to release the fixed state between the support shafts and the spindle unit, the process for detaching the spindle unit from the aforementioned support head component requires sliding the at least one support shaft in its axial direction to disengage the support shaft from the spindle unit. This process for sliding the support shaft in its axial direction varies depending on the arrangement of the elements in the support head component, but is generally implemented in a manner such that the plurality of elements contained within the support head component is detached in a certain order starting from the elements located farthest from the spindle unit, thereby bringing the support shaft into the displaceable state, and the support shaft is subsequently slid in its axial direction.

The support head component is usually heavy and large in size. For this reason, the aforementioned process is generally implemented on the machine tool with the support head component remain attached to the machine tool, or in other words, without detaching the support head component from the machine tool. However, performing the aforementioned detachment process of the plurality of elements contained within the housing on the machine tool leads to extremely bad workability in view of, for example, the working space, and the process thus requires a large amount of time as well as putting a large amount of workload on the operator. In addition, the detached elements need to be assembled back into the housing with high precision, which is also very time consuming.

Patent Document 1: Japanese Unexamined Patent Application Publication No. 2003-48135

DISCLOSURE OF INVENTION

Problems to be Solved by the Invention

Accordingly, it is an object of the present invention to provide a support head component that supports a spindle unit included in a machining head for a machine tool, in which the support head component is given a configuration that allows for easy maintenance.

Means for Solving the Problems

The present invention is directed to a machining head for a machine tool, which includes a spindle unit including a spindle to which a tool is attachable; and a support head component that supports the spindle unit, the support head component including an index mechanism that uses a drive motor as a drive source to rotate the spindle unit about an axis line extending perpendicular to a rotary axis line of the spindle in order to index an angular position of the spindle unit.

The present invention is characterized in that the support head component includes first and second support segments and a base segment that supports both the first and second support segments, the first and second support segments being disposed opposite to each other across the spindle unit to hold the spindle unit therebetween such that a center of axle of the spindle unit is aligned with the rotary axis line, the first and second support segments respectively including support shafts whose opposing end surfaces have the spindle unit secured thereto. Moreover, at least one of the first and second support segments includes a housing as a main body that is independent of the base segment. Furthermore, the housing is attached to the base segment by means of a plurality of first screw members screwed to the base segment, the plurality of first screw members being manipulatable from the outside of the base segment or the housing in a state where the housing is attached to the base segment. The spindle unit is attached to the support shafts by means of a plurality of second screw members screwed to the support shafts, the plurality of second screw members being manipulatable from the outside of the housing in a state where a corresponding one of the support shafts is contained within the housing.

The expression "manipulatable from the outside" refers to a state where the manipulatable head portions of the screw members (i.e. portions to which a tool is insertable) are exposed to the outside or are directly visible, as viewed from the outside of the base segment or the housing. However, this expression also includes a state where the housing has a detachable cover attached thereto, such that the manipulatable head portions of the screw members can be made visible by removing the cover.

Advantages

According to the machining head for the machine tool of the present invention, at least one of the pair of support segments included in the support head component has a housing that is independent of the base segment, and the housing is detachably attached to the base segment by means of the first screw members. Consequently, by simply unscrewing the first screw members to release the fixed state between the support segment (housing) and the base segment, the support segment can be made displaceable together with the support shaft thereof with respect to the base segment. Thus, when detaching the spindle unit from the support head component for maintenance purposes, such as repair, the detachment process only requires unscrewing the second screw members for releasing the fixed state between the spindle unit and the support shaft in one of the support segments, and unscrewing the first screw members for releasing the fixed state between the base segment and the one of support segments (housing). Thus, the one of support segments, including the support shaft thereof, can be made displaceable with respect to the spindle unit supported by the base segment through that support segment and the other support segment.

Specifically, the process for displacing one of the support shafts in its axial direction for detaching the spindle unit from the support head component can be achieved by simply manipulating the first and second screw members, thereby facilitating the process and reducing the time required for the process. In addition, the first and second screw members can be manipulated from the outside of the housing in a state where the support segments are attached to the base segment and where the spindle unit is attached to the support segments. Consequently, the aforementioned process can be implemented without having to detach the elements contained within the housing.

Furthermore, according to the present invention, each of the support segments can be detached from the support head component while maintaining the assembled state of the elements contained in the support segment (housing). Accordingly, a process such as an adjustment of the elements can be performed at a location other than the machine tool, and can be facilitated since the assembled state of the elements is maintained.

REFERENCE NUMERALS 1 machine tool
10 machining head
13, 15 screw member (second screw member)
17 screw member (first screw member)
20 spindle unit
21 spindle
25 DD motor
25a rotor
25b stator
30 support head component (first support head component)
30a leg segment (first support segment)
30b leg segment (second support segment)
30c base segment
31a, 31b housing
32, 39 rotary shaft
33 DD motor (drive motor)
33a rotor
33b stator
34 clamp mechanism
34a clamp sleeve
35, 36 bearing
37, 38 rotary joint
37a, 38a distributor 37b, 38b shaft
41, 44 rotation detector
41a, 44a detector head
41b, 44b detector ring
50 second support head component
51 housing
52 rotary shaft
53 DD motor
53a stator
53b rotor
54 clamp sleeve
55 distributor
56 bearing (triple cylindrical roller bearing)
60 support head component
60a, 60b leg segment (support segment)
61 housing
62 rotary shaft
63 DD motor (drive motor)
63a rotor
63b stator
65 bearing
66 clamp sleeve
67 rotary joint
67a first distributor
67b second distributor
67c shaft
68 rotation detector
70 bearing holder
70a1 cylindrical portion
70a2 flange portion
70a4 through hole
70b braking member
70c screw member
70a5 supporter
70a6 hole
72 screw member (second screw member)
74 screw member (first screw member)

BEST MODES FOR CARRYING OUT THE INVENTION

Figure 1:
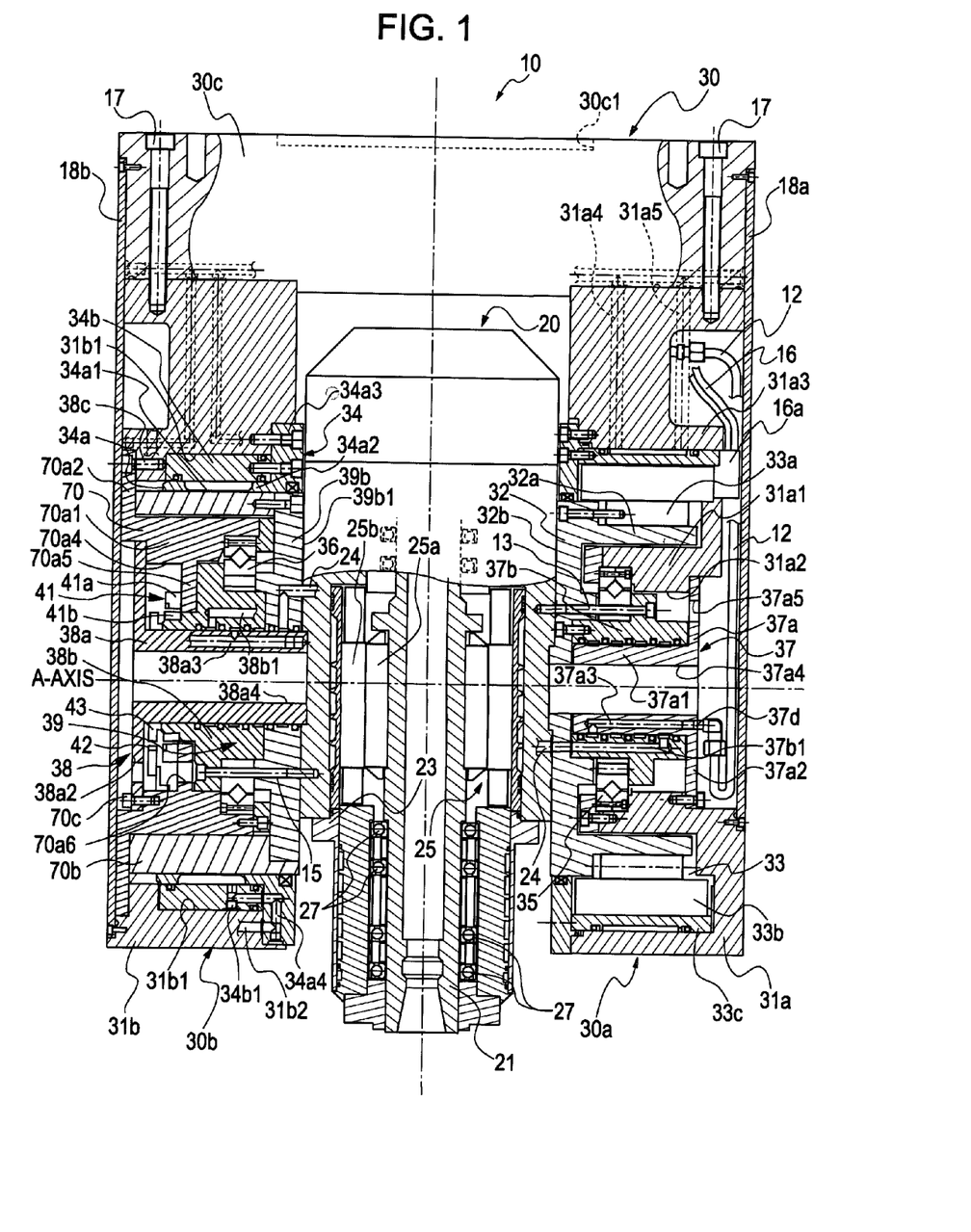
FIG. 1 is a front partially-cutaway view of a support head component included in a machining head according to a first embodiment of the present invention.
Figure 2:
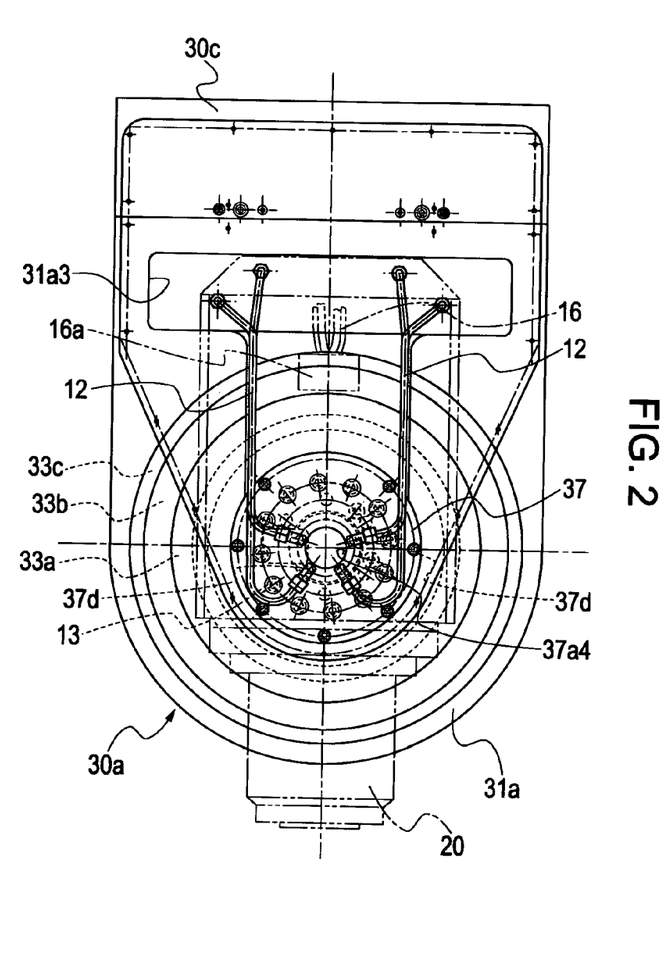
FIG. 2 is a side view of the support head component in the machining head according to the first embodiment of the present invention.
Figure 3:
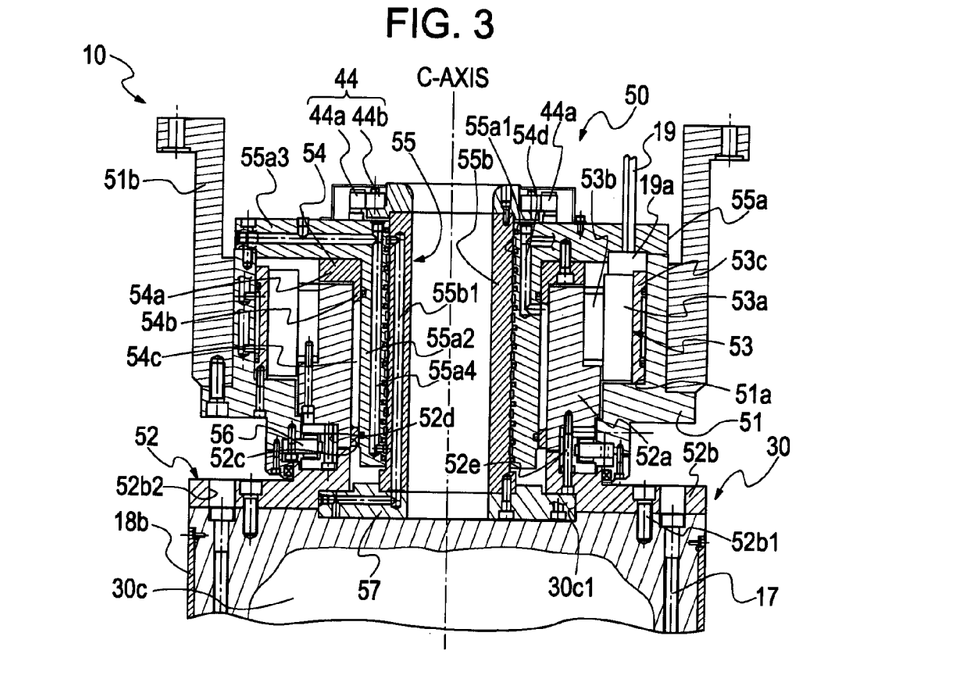
FIG. 3 is a front partially-cutaway view of the machining head according to the first embodiment of the present invention.

Embodiments of the present invention will now be described with reference to the drawings. FIGS. 1 to 3 illustrate a first embodiment of the present invention. Referring to FIG. 3, a machining head 10 includes a spindle unit 20 having a spindle 21 to which a tool can be attached, a first support head component 30 (corresponding to support head component according to the present invention) that supports the spindle unit 20, and a second support head component 50 that supports the first support head component 30.

The spindle unit 20 is a spindle head having a drive motor built therein, and the built-in drive motor rotates the spindle 21 at high speed. A housing 23 of the spindle unit 20 has the spindle 21 extending therethrough and accommodates a drive motor 25 that surrounds the spindle 21. The drive motor 25 includes a rotor 25a fitted around the spindle 21, and a stator 25b facing an outer periphery surface of the rotor 25a. The spindle 21 is rotatably supported by a plurality of bearings 27, such as angular contact bearings, arranged in a front-back direction of the drive motor 25, that is, in the vertical direction in FIG. 1. When an exciting current is supplied to the stator 25b, an excitation force is generated between the rotor 25a and the stator 25b. The rotor 25a rotates in response to the excitation force, whereby the spindle 21 is rotated.

In addition to supporting the spindle unit 20, the first support head component 30 has a function of rotating the spindle unit 20 around an axis line extending perpendicular to a rotary axis line of the spindle 21 in order to index the angular position of the spindle unit 20. This axis line extending perpendicular to the rotary axis line of the spindle 21 will be referred to as an A-axis hereinafter.

The first support head component 30 has the shape of a fork in which a pair of leg segments 30a, 30b corresponding to first and second support segments of the present invention is joined to a base segment 30c. The spindle unit 20 is supported between the leg segments 30a, 30b. Specifically, the pair of leg segments 30a, 30b respectively contains therein a pair of rotatable support shafts for supporting the spindle unit 20.

In the first embodiment, the first support head component 30 is equipped with a DD motor 33 that corresponds to a drive motor according to the present invention. The DD motor 33 serves as a drive source of an index mechanism for rotating the spindle unit 20. In the first embodiment, the DD motor 33 is provided only in the leg segment 30a (first support segment) of the two leg segments 30a, 30b. Regarding the pair of support shafts, the support shaft in the leg segment 30a will be referred to as a driving support shaft hereinafter, whereas the support shaft in the leg segment 30b will be referred to as a driven support shaft hereinafter.

The configuration of the leg segment 30a (first support segment) equipped with the DD motor 33 will be described in detail below.

The leg segment 30a has a housing 31a as a main body, which is independent of the base segment 30c. The housing 31a is attached to the base segment 30c by means of a plurality of screw members 17 (corresponding to first screw members according to the present invention) screwed to the base segment 30c. Accordingly, the leg segment 30a can be detached from the base segment 30c by unscrewing the screw members 17 that fix the base segment 30c and the housing 31a together.

The housing 31a accommodates, for example, a rotor 33a and a stator 33b that constitute the DD motor 33, the driving support shaft that supports the spindle unit 20, a bearing 35 such as a cross roller bearing for rotatably supporting the driving support shaft, and a rotary joint 37 for supplying machining fluid (which will simply be referred to as fluid hereinafter) to the spindle unit 20.

A side of the housing 31a proximate to the spindle unit 20 has a large opening through which the DD motor 33 and a rotary shaft to be described below are inserted. Moreover, the housing 31a also has a cylindrical portion 31a1 extending along the A-axis from a side surface of the housing 31a farthest from the spindle unit 20. The cylindrical portion 31a1 has a through hole 31a2 through which the rotary joint 37 extends.

The side surface of the housing 31a farthest from the spindle unit 20 has a recess 31a3 through which a fluid-supply pipe and a current-supply cable to be described below extend. A side of the leg segment 30a farthest from the spindle unit 20 has a side-surface cover 18a attached thereto. The side-surface cover 18a covers the recess 31a3. FIG. 2 shows a state where the side-surface cover 18a is removed.

The rotary joint 37 includes a distributor 37a fixed to the housing 31a and a shaft 37b rotatably fitted around an outer periphery surface of the cylindrical portion 37a1 of the distributor 37a. The center of the rotary joint 37 (distributor 37a) is provided with a through hole 37a4 through which, for example, cables can extend toward the spindle unit 20.

In a state where the distributor 37a extends through the through hole 31a2 of the housing 31a, a flange portion 37a2 of the distributor 37a is attached to the housing 31a by means of a plurality of screw members arranged in a circumferential direction. The distributor 37a has a plurality of fluid channels 37a3 that are arranged at different positions in the circumferential direction. The fluid channels 37a3 are provided for supplying or discharging fluid. On the other hand, the shaft 37b has a plurality of fluid channels 37b1 that correspond to the fluid channels 37a3 of the distributor 37a. In FIG. 1, only one of the fluid channels 37a3 and one of the fluid channels 37b1 are representatively shown.

The fluid channels 37a3 and the fluid channels 37b1 corresponding thereto communicate with each other through annular grooves extending around an engagement surface between the distributor 37a and the shaft 37b. This communication state is maintained even upon rotation of the shaft 37b. Furthermore, each of the fluid channels 37b1 communicates with a fluid supply or discharge port 24 of the spindle unit 20. The distributor 37a and the shaft 37b have seal members interposed therebetween for attaining a sealed state between the annular grooves.

The distributor 37a also has a plurality of fluid supply or discharge ports 37d arranged at different positions in the circumferential direction thereof. Each of the ports 37d is connected to a fluid supply or discharge pipe 12. Fluid supplied from a supply pipe 12 is transferred from the rotary joint 37 to the spindle unit 20 through the corresponding port 24. When the fluid is subject to circulation, the fluid circulating within the spindle unit 20 is discharged to a discharge pipe 12 via the rotary joint 37.

The DD motor 33 is constituted by the stator 33b secured to the housing 31a and the rotor 33a disposed facing an inner periphery surface of the stator 33b.

The stator 33b is fitted within an inner periphery surface of a stator sleeve 33c fixed to the housing 31a. The stator sleeve 33c has an annular groove around an outer periphery surface thereof. On the other hand, the housing 31a has a fluid supply path 31a4 and a fluid discharge path 31a5 that communicate with the annular groove 33. A cooling fluid, such as oil, for cooling the DD motor 33 is supplied from the fluid supply path 31a4 towards the annular groove so as to reduce heat generated by the DD motor 33 due to the rotation of the rotor 33a. Although not shown specifically in the drawings, the annular groove has a helical shape so that when fluid is supplied from the fluid supply path 31a4, the fluid circulates the annular groove so as to be discharged from the fluid discharge path 31a5.

The rotor 33a is fitted around an outer periphery surface of a rotary shaft 32 rotatably disposed within the housing 31a. The rotary shaft 32 is disposed concentrically with a rotary axis line of the shaft 37b of the rotary joint 37 and is fixed to the shaft 37b by means of a plurality of screw members arranged in the circumferential direction. The rotor 33a is disposed such that its outer periphery surface faces the inner periphery surface of the stator 33b. The rotor 33a is fitted around an outer periphery surface of a cylindrical portion 32a of the rotary shaft 32 in a relatively non-rotatable manner with respect to the rotary shaft 32.

An end surface 32b of the rotary shaft 32 proximate to the spindle unit 20 has the spindle unit 20 fixed thereto by means of a plurality of screw members 13 arranged in the circumferential direction. The screw members 13 correspond to second screw members according to the present invention. In other words, the spindle unit 20 is fixed to the end surface 32b of the rotary shaft 32 so as to be supported by the rotary shaft 32. Consequently, in the leg segment 30a, the rotary shaft 32 and the shaft 37b of the rotary joint 37 rotating together with the rotary shaft 32 constitute the driving support shaft for the spindle unit 20. The bearing 35 interposed between the shaft 37b of the rotary joint 37 and the cylindrical portion 31a1 of the housing 31a rotatably supports the driving support shaft with respect to the housing 31a.

In a state where the spindle unit 20 is fixed to the driving support shaft with the plurality of screw members 13, the flange portion 37a2 of the distributor 37 in the rotary joint 37 is located at a side of the head portions of the screw members 13 that is opposite the spindle unit 20 in the A-axis direction. On the other hand, the flange portion 37a2 of the distributor 37 has a plurality of holes 37a5 through which the screw members 13 can be manipulated. This implies that when the side-surface cover 18a is removed, the screw members 13 can be manipulated from the outside of the housing 31a.

The configuration of the leg segment 30b (second support segment) that supports the spindle unit 20 at a position opposite to that of the leg segment 30a will be described in detail below.

The leg segment 30b has a housing 31b as a main body, which is independent of the base segment 30c. Similar to the housing 31a, the housing 31b is attached to the base segment 30c by means of the plurality of screw members 17 screwed to the base segment 30c. Accordingly, the leg segment 30b can also be detached from the base segment 30c by unscrewing the screw members 17 that fix the base segment 30c and the housing 31b together.

The housing 31b has a through hole 31b1 extending in the A-axis direction. Within this through hole 31b1 are fitted, for example, a clamp mechanism 34 for maintaining the angular position of the spindle unit 20, the driven support shaft for supporting the spindle unit 20, a bearing 36 for rotatably supporting the driven support shaft, and a rotary joint 38. A side surface of the housing 31b farthest from the spindle unit 20 has a side-surface cover 18b attached thereto.

The rotary joint 38 is similar to the rotary joint 37 provided in the leg segment 30a, and includes a distributor 38a fixed to a cylindrical portion 70a1 of a bearing holder 70 and a shaft 38b rotatably fitted on the distributor 38a.

In a state where the distributor 38a extends through a through hole 70a4 of the bearing holder 70, the flange portion 38a2 of the distributor 38a is attached to the bearing holder 70 by means of a plurality of screw members 70c arranged in the circumferential direction. Furthermore, the center of the distributor 38a is provided with a through hole 38a4 to allow a cable etc. to extend therethrough toward the spindle unit 20.

The distributor 38a has a plurality of fluid channels 38a3 that are arranged at different positions in the circumferential direction. The fluid channels 38a3 are provided for supplying or discharging fluid. On the other hand, the shaft 38b has a plurality of fluid channels 38b1 that correspond to the fluid channels 38a3 of the distributor 38a. In FIG. 1, only one of the fluid channels 38a3 and one of the fluid channels 38b1 are representatively shown.

The fluid channels 38a3 and the fluid channels 38b1 corresponding thereto communicate with each other through annular grooves extending around an engagement surface between the distributor 38a and the shaft 38b. This communication state is maintained even upon rotation of the shaft 38b. Furthermore, each of the fluid channels 38b1 communicates with a fluid supply or discharge port 24 of the spindle unit 20. The distributor 38a and the shaft 38b have seal members interposed therebetween for attaining a sealed state between the annular grooves.

The bearing holder 70 is constituted by the cylindrical portion 70a1 and a flange portion 70a2 extending outward radially from an end of the cylindrical portion 70a1 opposite the leg segment 30a. The flange portion 70a2 of the bearing holder 70 is attached to the housing 31b by means of a plurality of screw members 38c arranged in the circumferential direction. Furthermore, the center of the bearing holder 70 is provided with a through hole 70a4 extending in the A-axis direction.

In the leg segment 30b, the rotary shaft 39 corresponding to the rotary shaft 32 of the leg segment 30a is constituted by the flange member 39b and the shaft 38b of the rotary joint 38 joined to the flange member 39b. The rotary shaft 39 is supported by the bearing holder 70 in a rotatable fashion through the bearing 36. The rotary shaft 39 (i.e., the flange member 39b and the shaft 38b of the rotary joint 38) is disposed such that a rotary axis line thereof is aligned with the rotary axis line of the rotary shaft 32 in the leg segment 30a. These two rotary axis lines are aligned with the A-axis.

The flange member 39b has an end surface 39b1 at a side thereof proximate to the leg segment 30a. The end surface 39b1 is parallel to the end surface 32b of the rotary shaft 32 in the leg segment 30a. The end surface 39b1 has the spindle unit 20 joined thereto by means of a plurality of screw members 15 arranged in the circumferential direction. Consequently, in the leg segment 30b, the rotary shaft 39 (i.e., the flange member 39b and the shaft 38b of the rotary joint 38) functions as the driven support shaft for supporting the spindle unit 20. The outer periphery surface of the flange member 39b of the rotary shaft 39 is fixed to a cylindrical braking member 70b such that the braking member 70b rotates together with the rotary shaft 39. Accordingly, the braking member 70b also corresponds to part of the driven support shaft.

The clamp mechanism 34 for maintaining the rotational position (angular position) of the spindle unit 20 is mainly constituted by a clamp sleeve 34a. The clamp sleeve 34a includes a cylindrical portion 34a2 having an annular groove 34a1 that forms a pressure chamber, and a flange portion 34a3 extending outward radially from an end of the cylindrical portion 34a2 proximate to the spindle unit 20. The clamp sleeve 34a is non-rotatably fixed to the housing 31b by means of a plurality of screw members that are arranged in the circumferential direction and are screwed to the flange portion 34a3. The cylindrical portion 34a2 of the clamp sleeve 34a surrounds the braking member 70b in a manner such that the cylindrical portion 34a2 permits rotation of the braking member 70b.

The cylindrical portion 34a2 of the clamp sleeve 34a and the housing 31b have an annular, pressure-receiving member 34b interposed therebetween. In detail, the pressure-receiving member 34b is fitted within the through hole 31b1 of the housing 31b. The pressure-receiving member 34b is fixed to the flange portion 34a3 of the clamp sleeve 34a in a relatively non-rotatable fashion by means of a plurality of screw members screwed to the flange portion 34a3. On the other hand, the cylindrical portion 34a2 of the clamp sleeve 34a has the annular groove 34a1 which is open towards the pressure-receiving member 34b. The annular groove 34a1 and the inner periphery surface of the pressure-receiving member 34b together form a pressure chamber. This pressure chamber communicates with a fluid channel 34b1 provided in the pressure-receiving member 34b. The fluid channel 34b1 communicates with a fluid channel 31b2 provided in the housing 31b through a fluid channel 34a4 provided in the flange portion 34a3 of the clamp sleeve 34a.

In the clamp mechanism 34, when pressure fluid, such as pressure oil, is supplied to the pressure chamber through these fluid channels, a thin-walled section in the cylindrical portion 34a2 of the clamp sleeve 34a, which corresponds to the annular groove 34a1, becomes deformed inward in the radial direction of the cylindrical portion 34a2. As a result, a clamping force acts on the braking member 70b in the radially-inward direction, whereby a clamped state is attained in which the braking member 70b and the rotary shaft 39 combined therewith are prevented from rotating. When the supply of pressure fluid to the pressure chamber is stopped, the thin-walled section of the cylindrical portion 34a2 becomes released from the deformed state. This eliminates the clamping force acting on the braking member 70b, thereby releasing the clamped state.

The leg segment 30b also contains a rotation detector 41 for detecting the rotational angle of the rotary shaft 39 (i.e. the angular position of the spindle unit 20) and an angle detector 42 for limiting the rotational range of the spindle unit 20.

The rotation detector 41 includes a detector ring 41b attached to a predetermined position of the outer periphery surface of the shaft 38b, and a detector head 41a attached to the bearing holder 70 at a position facing the outer side of the detector ring 41b. A detection signal detected by the rotation detector 41 that indicates the angular position of the spindle unit 20 is sent to a control apparatus (not shown) of a machine tool in which the machining head 10 according to the present invention is installed. The detection signal is used for rotation control (numerical control) of the spindle unit 20. It should be noted that the rotation detector of the present invention does not have to have the above-described configuration, and may have another known configuration.

The angle detector 42 is defined by, for example, a limit switch, which is mounted on a support plate provided within the through hole 70a4 of the bearing holder 70 and faces a periphery surface of a disc-shaped member 43 attached to an end of the rotary shaft 39. The periphery surface of the disc-shaped member 43 is provided with a dog that corresponds to a permissible angle range. When the angle detector 42 is opposed to the dog, the limit switch 42 is in an inoperative mode. Consequently, when the spindle unit 20 rotates to exceed a permissible angle due to, for example, control failure, the limit switch 42 detects that condition and sends a detection signal to the control apparatus of the machine tool as, for example, an emergency stoppage signal.

In a state where the spindle unit 20 is fixed to the driven support shaft with the plurality of screw members 15, a supporter 70a5 provided within the through hole 70a4 of the bearing holder 70 is located at a side of the head portions of the screw members 15 that is opposite the spindle unit 20 in the A-axis direction. On the other hand, the supporter 70a5 has a plurality of holes 70a6 through which the screw members 15 can be manipulated. Similarly, the flange portion 38a2 of the distributor 38a has a plurality of holes through which the screw members 15 can be manipulated. This implies that when the side-surface cover 18b is removed, the screw members 15 can be manipulated from the outside of the housing 31b.

The second support head component 50 in the machining head 10 will be described in detail below.

As mentioned above, in addition to the first support head component 30 (corresponding to support head component according to the present invention), the machining head 10 in the first embodiment is equipped with the second support head component 50 that supports the first support head component 30. The first support head component 30 is supported by, for example, a main-shaft head of the machine tool through the second support head component 50. Referring to FIG. 3, the second support head component 50 is provided for rotating the first support head component 30 around an axis line extending in the vertical direction. This axis line is parallel to the Z-axis of the machine tool and will be referred to as a C-axis hereinafter.

The second support head component 50 includes a housing 51 as a main body. The housing 51 has a through hole 51a that extends in the C-axis direction. The second support head component 50 also includes a rotary shaft 52 whose shaft member 52a is disposed within the through hole 51a. The first support head component 30 is combined with the second support head component 50 through the rotary shaft 52. The second support head component 50 is attached to, for example, the main-shaft head of the machine tool through an annular supporter 51b attached to the housing 51.

The second support head component 50 includes a DD motor 53 for rotating the rotary shaft 52, a clamp sleeve 54 for maintaining the rotational position of the rotary shaft 52, and a rotary joint 55 for supplying fluid to the first support head component 30, which are all disposed within the through hole 51a of the housing 51.

The DD motor 53 is constituted by a stator 53a fixed to the housing 51 through a stator sleeve 53c, and a rotor 53b fixed to the rotary shaft 52 at a position facing an inner periphery surface of the stator 53a. An exciting current for driving the DD motor 53 is supplied by means of a cable 19 connected to the DD motor 53 through a connector 19a.

The rotary shaft 52 includes the shaft member 52a disposed rotatably within the through hole 51a of the housing 51, and a flange member 52b attached to an end of the shaft member 52a proximate to the first support head component 30 and extending outward radially in directions perpendicular to the C-axis. The rotary shaft 52 has a through hole 52c through which the rotary joint 55 extends.

As shown in FIG. 3, the shaft member 52a and the flange member 52b of the rotary shaft 52 have a bearing housing 52d therebetween. The bearing housing 52d and the housing 51 have a bearing 56 interposed therebetween. With the bearing 56, the rotary shaft 52 is supported in a rotatable fashion with respect to the housing 51. The bearing 56 in FIG. 3 is a triple cylindrical roller bearing (triple roller bearing/axial-radial roller bearing), which is a type of compound-roller pivot bearing, and is capable of receiving large amounts of load in the axial and radial directions.

The rotor 53b of the DD motor 53 is fitted around an outer periphery surface of the shaft member 52a. Thus, when the rotor 53b rotates, the shaft member 52a is rotated about the C-axis. The flange member 52b is joined to the shaft member 52a by means of a plurality of screw members 52e arranged in the circumferential direction and thus rotates together with the shaft member 52a. Furthermore, the flange member 52b has a plurality of screw members 52b1 screwed thereto in the circumferential direction. With the screw members 52b1, the base segment 30c of the first support head component 30 is joined to the flange member 52b. Accordingly, when the DD motor 53 rotates the rotary shaft 52, the first support head component 30 is rotated together with the rotary shaft 52.

The rotary joint 55 is similar to the rotary joints 37, 38 provided in the first support head component 30, and includes a distributor 55a fixed to the housing 51 and a shaft 55b rotatably fitted within a through hole 55a1 provided in the distributor 55a. Specifically, the shaft 55b is disposed concentrically with the distributor 55a with respect to the C-axis.

The distributor 55a is constituted by a cylindrical portion 55a2 disposed within the through hole 52c of the rotary shaft 52 and a flange portion 55a3 extending outward radially from an end of the cylindrical portion 55a2 opposite the first support head component 30. The flange portion 55a3 of the distributor 55a is joined to the housing 51 by means of a plurality of screw members arranged in the circumferential direction.

On the other hand, an end of the shaft 55b proximate to the first support head component 30 is joined to a disc-shaped flange member 57. The shaft 55b is joined to the flange member 52b of the rotary shaft 52 through the flange member 57. Consequently, the shaft 55b rotates together with the rotary shaft 52. The flange member 57 has a shape that can be fitted to a circular recess 30c1 provided in the base segment 30c of the first support head component 30. With the flange member 57 and the recess 30c1 of the base segment 30c, the first support head component 30 and the second support head component 50 can be properly positioned with respect to each other when the two are combined.

The distributor 55a has a plurality of fluid channels 55a4 arranged at different positions in the circumferential direction. The fluid channels 55a4 are provided for taking in fluid from the outside. On the other hand, the shaft 55b also has a plurality of fluid channels 55b1 that correspond to the fluid channels 55a4 of the distributor 55a. Similarly, the fluid channels 55b1 are arranged at different positions in the circumferential direction.

The fluid channels 55a4 and the fluid channels 55b1 corresponding thereto communicate with each other through annular grooves extending around an engagement surface between the distributor 55a and the shaft 55b. This communication state is maintained even upon rotation of the shaft 55b. Furthermore, the fluid channels 55b1 in the shaft 55b communicate with the corresponding fluid channels 37a3 or 38a3 provided in the distributor 37a or 38a of the rotary joint 37 or 38 in the first support head component 30. Accordingly, fluid supplied to the distributor 55a of the rotary joint 55 from the outside is sent to the rotary joints 37 and 38 of the first support head component 30 via the shaft 55b.

The distributor 55a fixed to the housing 51 and the shaft member 52a of the rotary shaft 52 have the clamp sleeve 54 disposed therebetween for maintaining the rotational position of the rotary shaft 52. The clamp sleeve 54 has a flange portion 54a at which the clamp sleeve 54 is joined to the distributor 55a by means of a plurality of screw members, and is relatively rotatable with the rotary shaft 52. The clamp sleeve 54 has a cylindrical portion 54b provided with an annular groove 54c which is open towards the cylindrical portion 55a2 of the distributor 55a. The annular groove 54c and the outer periphery surface of the cylindrical portion 55a2 of the distributor 55a form a pressure chamber.

When pressure fluid is supplied to the pressure chamber through a fluid channel 54d provided in the distributor 55a, a thin-walled section of the cylindrical portion 54b, which corresponds to the annular groove 54c of the cylindrical portion 54b, becomes deformed outward in the radial direction of the cylindrical portion 54b. As a result, a clamping force acts on the rotary shaft 52 in the radially-outward direction, whereby a clamped state is attained in which the rotary shaft 52 is prevented from rotating.

An upper end portion of the rotary joint 55 is provided with a rotation detector 44 for detecting the amount of rotation of the rotary shaft 52, namely, the amount of rotation of the first support head component 30. The rotation detector 44 includes a pair of detector heads 44a, 44a disposed at predetermined positions on the distributor 55a, and a detector ring 44b which is attached to the shaft 55b rotatable together with the rotary shaft 52 and is disposed facing the detector heads 44a, 44a. Similar to the rotation detector 41 in the first support head component 30, a detection signal of the rotation detector 44 is sent to the control apparatus of the machine tool and is used for rotation control of the first support head component 30.

In the machining head 10 having the above-described configuration, the support head component (first support head component 30) holds the spindle unit 20 between the two support shafts of the pair of leg segments 30a and 30b so as to securely support the spindle unit 20 in a relatively non-rotatable fashion with respect to the two support shafts. Using the DD motor 33 to rotate the driving support shaft of the leg segment 30*a*, the spindle unit 20 is rotated about the rotary axis line of the support shafts (i.e. axis line or A-axis extending perpendicular to the rotary axis line of the spindle 21) to a desired angular position.

The DD motor 33 is driven in accordance with numerical control based on a preliminarily set program. With rotation control of the rotor 33*a*, the angular position of the spindle unit 20 is controlled via the driving support shaft. Consequently, the DD motor 33 and the driving support shaft (i.e. the rotary shaft 32 and the shaft 37*b*) linked with the DD motor 33 within the leg segment 30*a* function as the index mechanism for the spindle unit 20. An exciting current for driving the DD motor 33 is supplied by means of a cable 16 connected to the DD motor 33 through a connector 16*a*.

In the first support head component 30 according to the present invention, the housings 31*a*, 31*b* serving as main bodies of the leg segments 30*a*, 30*b* corresponding to the first and second support segments of the present invention are independent of the base segment 30*c*. Moreover, the housings 31*a*, 31*b* are detachably attached to the base segment 30*c* by means of the plurality of screw members 17 (first screw members) screwed to the base segment 30*a*. Moreover, the screw members 17 can be manipulated from the outside of the base segment 30*c* through holes 52*b*2 provided in the flange member 52*b* of the rotary shaft 52 in the second support head component 50.

According to the present invention, assuming that the spindle unit 20 is detached from the machining head 10 (i.e. the first support head component 30) by displacing the driving support shaft of the leg segment 30*a* in the A-axis direction, the side-surface cover 18*a* is first removed, and the screw members 13 maintaining the fixed state between the spindle unit 20 and the driving support shaft are unscrewed. Subsequently, the screw members 17 maintaining the fixed state between the base segment 30*c* and the housing 30*a* are unscrewed. With this simple process, the leg segment 30*a* becomes displaceable with respect to the base segment 30*c*, whereby the driving support shaft and the spindle unit 20 can be disengaged from each other. Subsequently, the spindle unit 20 can be simply detached from the first support head component 30 by unscrewing the plurality of screw members 15 that had maintained the fixed state between the spindle unit 20 and the housing 30*b*.

Accordingly, in the support head component (i.e. the first support head component 30) of the present invention, the support shaft thereof can be readily displaced in the A-axis direction for the attachment or detachment of the spindle unit 20 with a simple process. In addition, the support shaft can be displaced without having to remove the elements contained within the support segment, which implies that the support shaft can be displaced while still maintaining the assembled state of these elements. Therefore, the process for displacing the support shaft can be significantly simplified.

A second embodiment of the present invention will now be described with reference to FIG. 4.

In the support head component (the first support head component 30) of the machining head according to the first embodiment of the present invention, only one of the support segments of a pair for supporting the spindle unit 20 is provided with an index mechanism (DD motor) for rotating the spindle unit 20. In contrast, the second embodiment shown in FIG. 4 is characterized in that both leg segments of the support head component are provided with index mechanisms (DD motors), and that the present invention is applied to both index mechanisms.

Figure 4:
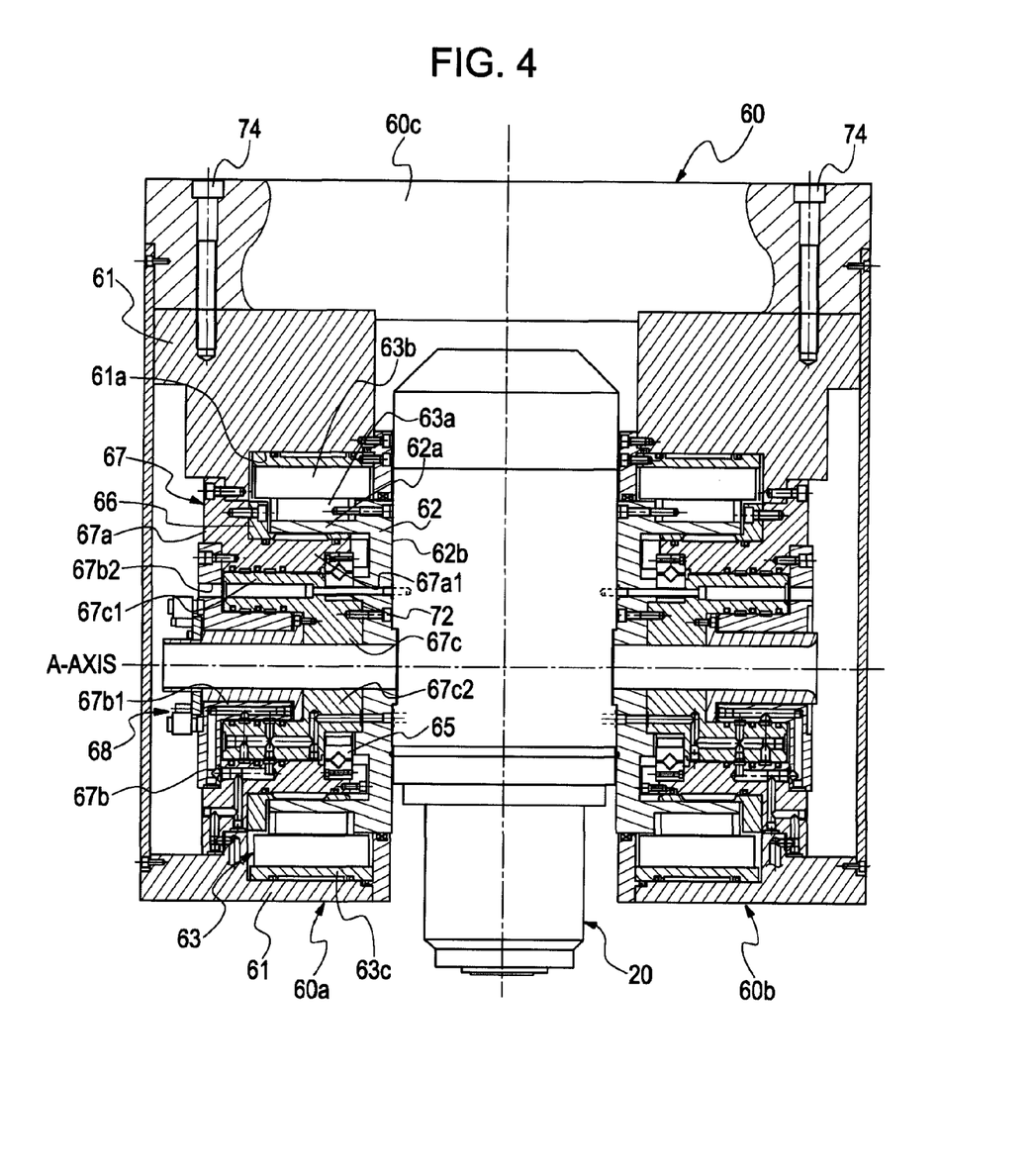
FIG. 4 is a front partially-cutaway view of a support head component included in a machining head according to a second embodiment of the present invention.

As mentioned above, in a support head component 60 shown in FIG. 4, a pair of leg segments 60*a* and 60*b* supporting the spindle unit 20 is both provided with index mechanisms including DD motors 63. The leg segments 60*a* and 60*b* in FIG. 4 have substantially the same internal configuration. Therefore, the description below will simply be directed to the leg segment 60*a*, and the description and reference numerals with regard to the leg segment 60*b* will be omitted.

In the support head component 60, the leg segment 60*a* has a housing 61 as a main body. The housing 61 has a through hole 61*a* that extends in the A-axis direction. The through hole 61*a* has disposed therein, for example, a DD motor 63, a support shaft that supports the spindle unit 20, a bearing 65 for rotatably supporting the support shaft, and a rotary joint 67. The leg segment 60*a* is also provided with a rotation detector 68, which is similar to that provided in the first embodiment. The rotation detector 68 is provided only in the leg segment 60*a*.

The DD motor 63 is similar to that in the first embodiment in that it is an inner-rotor-type DD motor constituted by a stator 63*b* secured to the housing 61 through a stator sleeve 63*c*, and a rotor 63*a* fitted around an outer periphery surface of a cylindrical portion 62*a* of a rotary shaft 62 at a position facing an inner periphery surface of the stator 63*b*. The rotary shaft 62 serves as part of the support shaft.

The rotary joint 67 has a similar function to that in the first embodiment. In the example shown in FIG. 4, the rotary joint 67 is constituted by first and second distributors 67*a*, 67*b* non-rotatably fixed to the housing 61, and a shaft 67*c* combined with the distributors 67*a*, 67*b* in a rotatable fashion. The shaft 67*b* has a large-diameter section 67*c*1 rotatably fitted between a cylindrical portion 67*a*1 of the first distributor 67*a* and a cylindrical portion 67*b*1 of the second distributor 67*b*, and a shaft section 67*c*2 around which the bearing 65 is fitted. With the bearing 65 fitted around the outer periphery surface of the shaft section 67*c*, the shaft 67*c* is supported in a rotatable fashion with respect to the first distributor 67*a*.

A rotary shaft 62 is joined to an end of the shaft 67*c* of the rotary joint 67 that is proximate to the spindle unit 20. The rotary shaft 62 has a cylindrical portion 62*a* that surrounds the cylindrical portion 67*a*1 of the first distributor 67*a* included in the rotary joint 67. The rotor 63*b* of the DD motor 63 is fitted around the outer periphery surface of the cylindrical portion 62*a*.

An end surface 62*b* of the rotary shaft 62 that is proximate to the spindle unit 20 has the spindle unit 20 joined thereto by means of a plurality of screw members 72 arranged in the circumferential direction. Consequently, the shaft 67*c*, which is rotatably supported by the first distributor 67*a* of the rotary joint 67 through the bearing 65, and the rotary shaft 62, which is joined to the shaft 67*c* so as to be rotatable together with the shaft 67*c*, correspond to the support shaft for supporting the spindle unit 20.

In the support head component 60, a clamp mechanism similar to that in the first embodiment is included in each of the leg segments 60*a*, 60*b*. Each of the clamp mechanisms has a clamp sleeve 66 as a main element, which is disposed between the first distributor 67*a* of the rotary joint 67 and the cylindrical portion 62*a* of the rotary shaft 62.

Furthermore, the support head component 60 according to the second embodiment is similar to that in the first embodiment in that the housing 61 serving as a main body of each of the leg segments 60*a*, 60*b* is independent of a base segment 60*c*. The housings 61 are detachably attached to the base segment 60*c* by means of a plurality of screw members 74 (corresponding to first screw members according to the present invention) screwed to the base segment 60*c*. In addition, the screw members 74 can be manipulated from the outside of the base segment 60*c*. Likewise, the screw members 72 (corresponding to second screw members according to the present invention) that maintain the fixed state between the spindle unit 20 and the support shaft (rotary shaft 62) can also be manipulated from the outside of each housing 61 through holes 67*b*2 provided in the second distributor 67*b* of the corresponding rotary joint 67. Consequently, the leg segments 60*a*, 60*b* of the support head component 60 can be detached from the base segment 60*c* by simply unscrewing the screw members 72, 74. The second embodiment can thus achieve similar advantages to those achieved in the first embodiment.

As a drive source of an index mechanism for rotating the spindle unit 20 in the embodiments described above, a DD motor is used in which a rotor and a stator thereof are contained within a housing and the rotor is fixed to a rotary shaft. As an alternative to such a DD motor, a drive motor that is attached externally to a side surface of the housing may be used, such that an output shaft of the drive motor is linked with the rotary shaft by means of a drive transmission mechanism. In that case, the drive transmission mechanism may include a worm wheel attached to the rotary shaft and a worm rotatably supported by the housing, such that a rotary shaft of the worm is linked with the output shaft of the drive motor by means of, for example, a gear.

Furthermore, although both the first and second support segments in the support head component are detachably attached to the base segment in the above embodiments, the present invention is not limited to this configuration. For example, the present invention may also include a configuration in which at least one of the first and second support segments is detachably attached to the base segment while the housing for the other support segment is integrated with the base segment. In other words, concerning the attachment and detachment of the spindle unit 20, at least one of the pair of support shafts only needs to be displaceable in the axial direction thereof. This means that the present invention may include a configuration in which only one of the first and second support segments is detachable from the base segment. However, in view of performing, for example, adjustment or repair of the elements contained in the first and second support segments, it is more advantageous that both the first and second support segments are made detachable from the base segment.

In the above embodiments, the combined state between the support segments and the base segment is maintained by means of the first screw members. In addition, for example, one of the base segment and each support segment may have a dovetail groove or a T-shaped groove extending in the A-axis direction, while the other may have a protrusion engageable with the groove. In that case, the base segment and each support segment can be engaged with each other at the dovetail groove or the T-shaped groove in a slidable fashion in the A-axis direction. The first screw members may be used to securely maintain the engagement state among the segments.

The technical scope of the present invention is not limited to the above embodiments, and modifications are permissible without departing from the scope of the claimed invention.

The invention claimed is:

1. A machining head (10) for a machine tool, which includes a spindle unit (20) including a spindle (21) to which a tool is attachable, and a support head component (30) that supports the spindle unit (20), the support head component (30) including an index mechanism that uses a drive motor (33) as a drive source to rotate the spindle unit (20) about an axis line extending perpendicular to a rotary axis line of the spindle (21) in order to index an angular position of the spindle unit (20), characterized in that the support head component includes first and second support segments (30*a*, 30*b*) and a base segment (30*c*) that supports both the first and second support segments (30*a*, 30*b*), the first and second support segments (30*a*, 30*b*) being disposed opposite to each other across the spindle unit (20) to hold the spindle unit (20) therebetween such that a center of axle of the spindle unit (20) is aligned with the rotary axis line, the first and second support segments (30*a*, 30*b*) respectively including support shafts (32, 37*b*, 38*b*, 39*b*) whose opposing end surfaces have the spindle unit (20) secured thereto, that at least one of the first and second support segments (30*a*, 30*b*) includes a housing (31*a*, 31*b*) as a main body that is independent of the base segment (30*c*), that the housing (31*a*, 31*b*) is attached to the base segment (30*c*) by means of a plurality of first screw members (17) screwed to the base segment (30*c*), the plurality of first screw members (17) being manipulatable from the outside of the base segment (30*c*) or the housing (31*a*, 31*b*) in a state where the housing (31*a*, 31*b*) is attached to the base segment (30*c*), and that the spindle unit (20) is attached to the support shafts (32, 37*b*, 38*b*, 39*b*) by means of a plurality of second screw members (13, 15) screwed to the support shafts (32, 37*b*, 38*b*, 39*b*), the plurality of second screw members (13, 15) being manipulatable from the outside of the housing (31*a*, 31*b*) in a state where a corresponding one of the support shafts (32, 37*b*, 38*b*, 39*b*) is contained within the housing (31*a*, 31*b*).

\* \* \* \* \*